United States Patent [19]
Sargent

[11] 3,778,061
[45] Dec. 11, 1973

[54] CONVERTIBLE HORSESHOE PIT

[76] Inventor: Walter W. Sargent, 125 North St., Chardon, Ohio 44024

[22] Filed: Nov. 13, 1972

[21] Appl. No.: 306,354

[52] U.S. Cl. ............................................. 273/104
[51] Int. Cl. ............................................ A63b 71/02
[58] Field of Search .......................... 273/104, 100

[56] References Cited
UNITED STATES PATENTS
3,232,619   2/1966   Burk ............................. 273/123 R
3,547,442   12/1970   Fenicchia ......................... 273/104

Primary Examiner—Richard C. Pinkham
Assistant Examiner—Marvin Siskind
Attorney—Robb & Robb

[57] ABSTRACT

There is disclosed a horseshoe pit construction which is provided in a package for installation in the ground and having a pit member that is supported by a frame for raising out of a chamber or housing and which will enable the pit member to be rotated so as to present a surface flush with the ground when lowered into position, a removable cover means being furnished to close the member and retain the usual clay availed of in such horseshoe game play therein, at the same time allowing the clay to assume a level condition for subsequent use.

6 Claims, 6 Drawing Figures

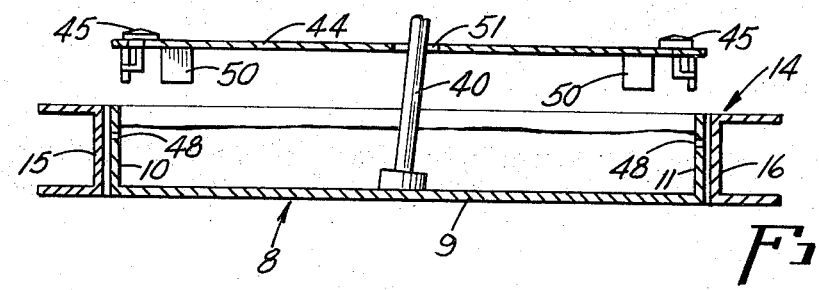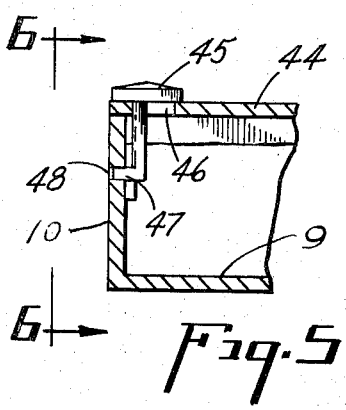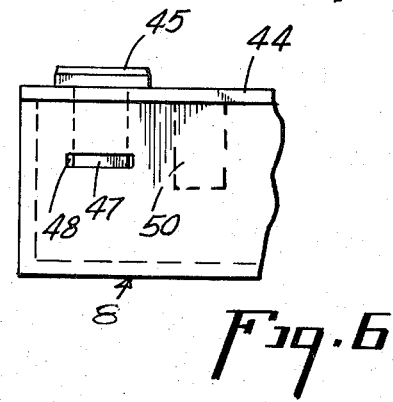

CONVERTIBLE HORSESHOE PIT

OBJECTS OF THE INVENTION

It is a principal object of this invention to provide horseshoe pit construction, in which a pit member is arranged so as to contain the usual clay material therein which is most often used, the pit member having a removable stake for emplacement therein, and being further provided with a cover which may be fastened in place, the entire pit member being rotatable so as to cause the clay material therewithin to slump into a level condition for subsequent use in the operation of the entire device.

A further object of the invention is to provide a pit member which may be raised and lowered so as to facilitate the rotation thereof, and is so arranged that the entire unit may be placed in the ground virtually in any place and ground used thereafter when the pit is not in use as a level portion of the area in which it is located without any obstruction or depression being presented for dangerous injury possible.

Another object of the invention is to provide a horseshoe pit in which the same may be mounted as a unit in the ground, hydraulic piston and cylinder instrumentalities availed of to raise and lower a pit member so as to permit the rotation thereof into a reverse position to thereafter conceal the stake normally provided and at the same time cause the material within the pit to be levelled by natural gravitational forces when not in use.

Other and further objects of the invention will be understood from a consideration of the specifications appended hereto and disclosed in the drawings, wherein:

FIG. 4 is a fragmentary sectional view, showing the cover position for placement over the pit member and prior to connection of the same therewith.

FIG. 5 is a fragmentary view in section, showing the locking means for retaining the cover on the pit member.

FIG. 6 is a further view to illustrate further details of the locking member.

DESCRIPTION OF THE INVENTION

Figure 1:
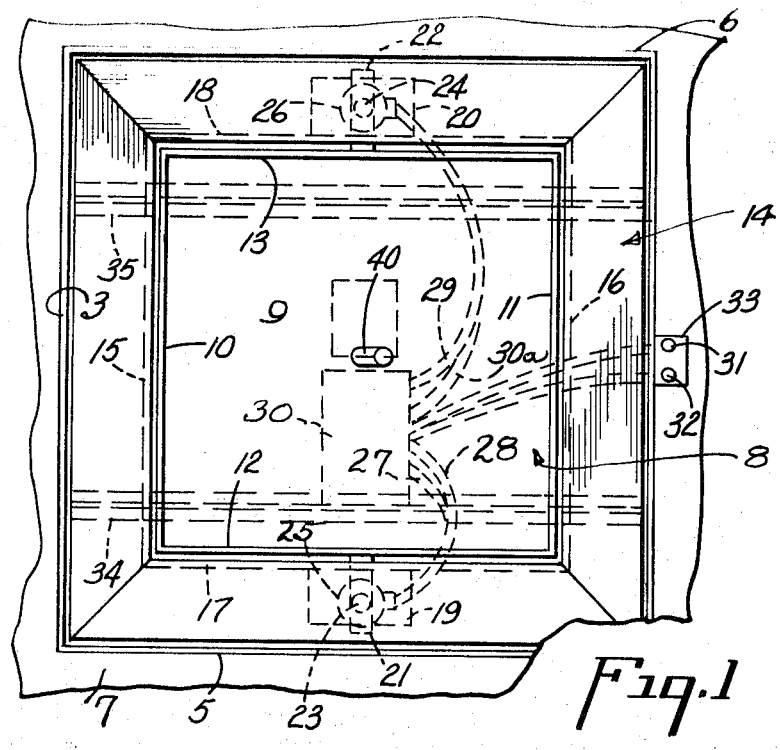
FIG. 1 is a top plan view showing the horseshoe pit construction in its normal, operable condition so to speak.
Figure 3:
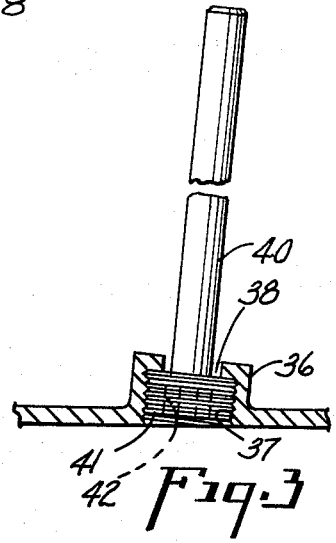
FIG. 3 is a detailed fragmentary view, showing the stake and its manner of mounting so as to be removable as the occasion may demand.
Figure 2:
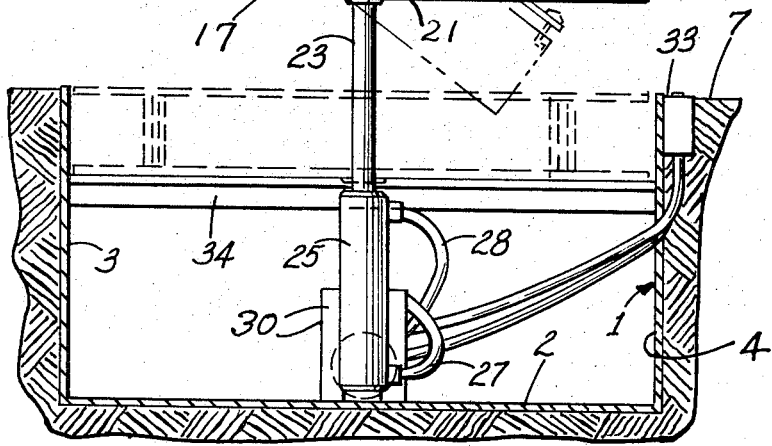
FIG. 2 is a vertical sectional view, to illustrate certain features of the pit construction, including the raising and lowering of the same and rotation of the pit member incorporated therein.

Turning initially to FIGS. 1 and 2, a chamber or housing 1 constitutes a generally rectangular unit having the bottom 2 and the upright sides 3, 4, 5 and 6 integral with the bottom 2 and having the upper edges substantially flush with the surface of the ground indicated at 7, the sides 3 to 6 inclusive being fastened to the bottom 2 and extending at right angles as will be clear from the disclosure.

The chamber or housing 1 is thus so constructed as to permit its emplacement in the ground, and likewise to contain the various working elements of the invention now to be more particularly described.

A pit member generally denoted at 8 is a substantially rectangular upwardly open box-like member including the bottom 9 a flat plate, with walls 10, 11, 12 and 13 extending upwardly at right angles thereto, this constituting a relatively shallow pan or box, the upper edges thereof terminating in the same plane and flush with a frame generally designated 14 which is formed of a U-shaped channel construction, having the channel bottom 15, 16, 17 and 18 positioned parallel to the walls 10, 11, 12 and 13 respectively of the pit member 8.

The flanges of the frame 14 connected to the channel bottoms 15, 16, 17 and 18 are parallel at the upper and lower eges of the channel bottoms and terminate adjacent the sides 3, 4, 5 and 6 of the chamber or housing 1.

This frame thus surrounds the pit member, and includes in its opposite sides constituting the bottoms 17 and 18, trunnion bearings 19 and 20 to receive the trunnions 21 and 22 respectively of the pit member 8, these trunnions 21 and 22 being suitably fastened to the walls 12 and 13 respectively, so that they will be able to support the pit member 8 for rotation with respect to the frame 14 as will be subsequently explained.

The trunnion bearings 19 and 20 are fixed to the upper ends of the pistons 23 and 24 respectively of hydraulic piston and cylinder units in which the cylinders are indicated at 25 and 26.

The cylinders 25 and 26 are suitably fastened to the bottom 2 of the chamber or housing 1, so as to be rigidly mounted with respect thereto, and include the necessary hydraulic hose connections such as suggested at 27 and 28 for the piston and cylinder unit 23–25, and 29 and 30a for the piston and cylinder unit 24–26, all of these hoses leading to a power unit generally indicated at 30, which unit is controlled in any suitable manner as for example by buttons or knobs 31 and 32 arranged in a suitable enclosure 33 at one side of the chamber or housing 1.

In order to support the frame 14 and pit member carried thereby in a position flush with the ground substantially, suitable transverse members 34 and 35 are provided, which are rigidly engaged with the sides 3 and 4 of the chamber or housing 1, in a suitable position whereby the bottom 9 or the pit member 8 may rest thereon, as well as the lower flanges of the frame 14.

The bottom 9 of the pit member 8 is equipped at its central portion with a boss 36, having a threaded interior 37 and an opening 38 therein, through which a removable stake generally denoted 40 may be inserted, the stake 40 having a threaded head 41 thereon with a suitable socket 42 therein, to facilitate threaded interengagement of the respective threads 37 and 41, making possible removal of the stake 40 when occasion may demand, such as for replacement thereof after damage.

It should be understood that it will be a simple matter to unscrew the stake 40 and insert a substitute therefor in any one of several positions which are possible to be attained by the construction as disclosed. Since one of the purposes of the invention is to make possible the natural tendency of the clay material ordinarily used in such pits to slump back into condition when encouraged so to do, it is desirable to be able to rotate the pit member 8 as suggested in FIG. 2, for that purpose as well as to move the stake 40 into a downwardly extending position whereby to present a smooth, flush upper surface by the bottom 9 of the pit member 8 into junction with the frame 14 and particularly the upper flanges thereof when the pit is not in use.

Since this will desirably require a cover, the same is disclosed in FIGS. 4, 5 and 6 as being ready to be assembled with the pit member 8 and including a plate 44 of the same size as the outline of the pit member 8 so that the plate 44 will fit over the upper edges of the walls 10, 11, 12 and 13 thereof, and in order to fasten the plate in its potition, suitable latch members 45 are arranged to slide in suitable rectangular openings 46 formed in the plate 44, the lower ends of the latches 45 having the outwardly extending portions 47 adapted to engage suitable slots 48 formed in the respective walls for the pit member 8, the heads of the latches 45 being manipulable backwardly and forwardly to carry the latches for engagement and disengagement with the slots 48 as will be understood.

In order to guide the cover plate 44 into proper position, suitable tabs 50 are provided, extending downwardly near the edges of the cover plate 44 so as to inter-engage with or slide along the inner surfaces of the walls 10, 11, 12 and 13.

The cover plate will necessarily be provided with a central opening 51 to receive the stake 40 therethrough when the cover is to be put in place.

When the cover plate 44 is put in place as suggested by FIGS. 5 and 6, it will thus totally enclose in conjunction with the pit member 8, any clay or other material normally within the pit member 8 and usually being a clay substance or which after use has become unlevel by reason of the impact of horseshoes availed of in playing the game, and the pit member 8 is desired to be rotated as initially suggested.

For this purpose all the piston and cylinder units are actuated by the buttons 31 and 32, 31 particularly for raising the pit member by reason of the fact it is supported in the frame 14, to a position as suggested in FIG. 2.

With the frame 14 and pit member 8 carried thereby in this position, the pit member 8 may thereupon be rotated as also suggested in this view, and ultimately be completely rotated 180 degrees so that the stake 40 is thereafter in a downwardly extending position, and the member 8 is substantially aligned with the frame 14, the same is thereafter lowered by manipulation of the button 32, for example, so that the frame 14 and pit member 8 thereafter rest upon the transverse supports 34 and 35.

The upper surface of the entire unit will therefore be substantially flush with the ground and will facilitate the location of a pair of these horseshoe pits in a driveway or the like which is constantly used for other purposes, but by reason of the ability to manipulate the pit member 8 as disclosed, make possible quick conversion of the driveway area into suitable horseshoe playing court for example.

At the same time that the pit members 8, (since there are usually two of them) have been rotated into their upside down position so to speak, and if permitted to stay there for any length of time, the material therein will slump into a generally level position again, making the pits ready for use in playing subsequent games.

The stake 40 may be replaced as the same is occasionally and ultimately damaged sufficiently by impact of the horseshoes thereagainst so that it is arranged for uniform results as the game is played.

I claim:

1. In horseshoe pit construction of the class described, in combination, a pit member, stake means positioned to extend upwardly from the member, means to raise and lower the member into and out of the ground, and means to facilitate rotation of the member to position the stake means so as to extend downwardly, whereby to provide a traffic surface substantially flush with the ground around the member.

2. The combination as claimed in claim 1, wherein the pit member is an upwardly open, box-like member, and a cover is releasably positioned thereon.

3. The combination as claimed in claim 2, wherein the stake means include a stake part and a threaded socket in the bottom of the member from which the part is removable.

4. The combination as claimed in claim 1, wherein the means to raise and lower the member comprise hydraulic piston and cylinder instrumentalities, power means for said instrumentalities and controls therefor.

5. The combination as claimed in claim 1, wherein the pit member comprises a rectilinear, upwardly open, box-like member, a chamber is provided to receive such member at the upper portion thereof, and the means to raise and lower the member are mounted in the chamber.

6. The combination as claimed in claim 5, wherein the pit member is provided with oppositely extending trunnions, a frame surrounds the pit member and the trunnions are engaged therewith, the chamber is located in the ground to receive the frame and support the same flush with such ground, hydraulic piston and cylinder instrumentalities connected to the frame, to raise and lower the same, power means to operate the instrumentalities, and controls are provided therefor.

* * * * *